United States Patent
Fujiwara et al.

(10) Patent No.: US 10,673,213 B2
(45) Date of Patent: Jun. 2, 2020

(54) WIRE GRIP AND LIVE WIRE DISTRIBUTING TOOL HAVING THE WIRE GRIP

(71) Applicant: NAGAKI SEIKI CO., LTD., Osaka (JP)

(72) Inventors: Kazude Fujiwara, Osaka (JP); Kensuke Mondori, Osaka (JP); Hideo Nouchi, Osaka (JP)

(73) Assignee: NAGAKI SEIKI CO., LTD., Osaka (JP)

( * ) Notice: Subject to any disclaimer, the term of this patent is extended or adjusted under 35 U.S.C. 154(b) by 0 days.

(21) Appl. No.: 16/088,554

(22) PCT Filed: Apr. 10, 2017

(86) PCT No.: PCT/JP2017/014714
§ 371 (c)(1),
(2) Date: Sep. 26, 2018

(87) PCT Pub. No.: WO2017/179550
PCT Pub. Date: Oct. 19, 2017

(65) Prior Publication Data
US 2019/0115732 A1 Apr. 18, 2019

(30) Foreign Application Priority Data
Apr. 14, 2016 (JP) .................................. 2016-081380

(51) Int. Cl.
*H02G 1/04* (2006.01)
*H02G 1/00* (2006.01)

(52) U.S. Cl.
CPC ............... *H02G 1/04* (2013.01); *H02G 1/005* (2013.01)

(58) Field of Classification Search
CPC ............ H02G 1/04; H02G 1/005; H02G 1/06; H02G 1/00; H02G 7/056; B25B 25/00; B66F 19/00; F16B 2/065
(Continued)

(56) References Cited

U.S. PATENT DOCUMENTS 5,152,701 A * 10/1992 Polidori ............... H01R 4/5091
403/396
5,320,565 A * 6/1994 Polidori .................. H01R 11/11
439/791
(Continued)

FOREIGN PATENT DOCUMENTS

JP B0002948786 7/1999
JP B0003015352 12/1999
(Continued)

OTHER PUBLICATIONS

International Search Report for Appl. No. PCT/JP2017/014714 dated May 9, 2017.

*Primary Examiner* — Christopher Garft
(74) *Attorney, Agent, or Firm* — Pearl Cohen Zedek Latzer Baratz LLP

(57) ABSTRACT

The wire grip includes an upper grasping part provided at a base for grasping an electric wire from above; a lower grasping part arranged to face the upper grasping part with the electric wire interposed therebetween and provided to be movable in a vertical direction with respect to the base; an arrow part provided at a bottom part of the lower grasping part integrally with the lower grasping part or as a separate body; a supporting body arranged on a side opposite to the lower grasping part with the arrow part interposed therebetween, wherein the supporting body pushes the arrow part by a screw to be screwed with a lower supporting part provided at a bottom part of the base and extending in a longitudinal (Continued)

direction of the base; and a holding part for holding the lower grasping part to prevent it from being spaced from the base.

3 Claims, 20 Drawing Sheets

(58) Field of Classification Search
USPC ..... 248/218.1, 229.15, 229.25, 228.6, 230.6; 294/116; 24/136 B; 439/811–812
See application file for complete search history.

(56) References Cited

U.S. PATENT DOCUMENTS

| | | | | |
|---|---|---|---|---|
| 5,547,404 | A * | 8/1996 | Nellis, Jr. | H01R 4/366 439/786 |
| 5,649,404 | A * | 7/1997 | Reinklou | E04G 21/3214 52/698 |
| 7,222,729 | B1 * | 5/2007 | Travis | B25B 5/04 198/813 |
| 7,387,546 | B2 * | 6/2008 | Copper | H01R 4/38 174/94 S |
| 8,512,070 | B2 * | 8/2013 | De France | H01R 4/38 439/479 |
| 10,164,356 | B2 * | 12/2018 | Diop | H01R 4/12 |
| 2005/0066482 | A1 * | 3/2005 | De France | H02G 7/056 24/136 R |
| 2012/0090139 | A1 * | 4/2012 | Scoggins | B25B 5/10 24/456 |
| 2013/0227823 | A1 * | 9/2013 | Diop | H02G 7/056 24/135 R |

FOREIGN PATENT DOCUMENTS

| | | |
|---|---|---|
| JP | 2000083309 | 3/2000 |
| JP | 2004304969 | 10/2000 |
| JP | 2002281625 | 9/2002 |
| JP | 2004-242477 | 8/2004 |
| JP | 2004-304969 | 10/2004 |
| JP | 2010088256 | 4/2010 |
| JP | 2011-67007 | 3/2011 |
| JP | 2014193085 | 10/2014 |

* cited by examiner

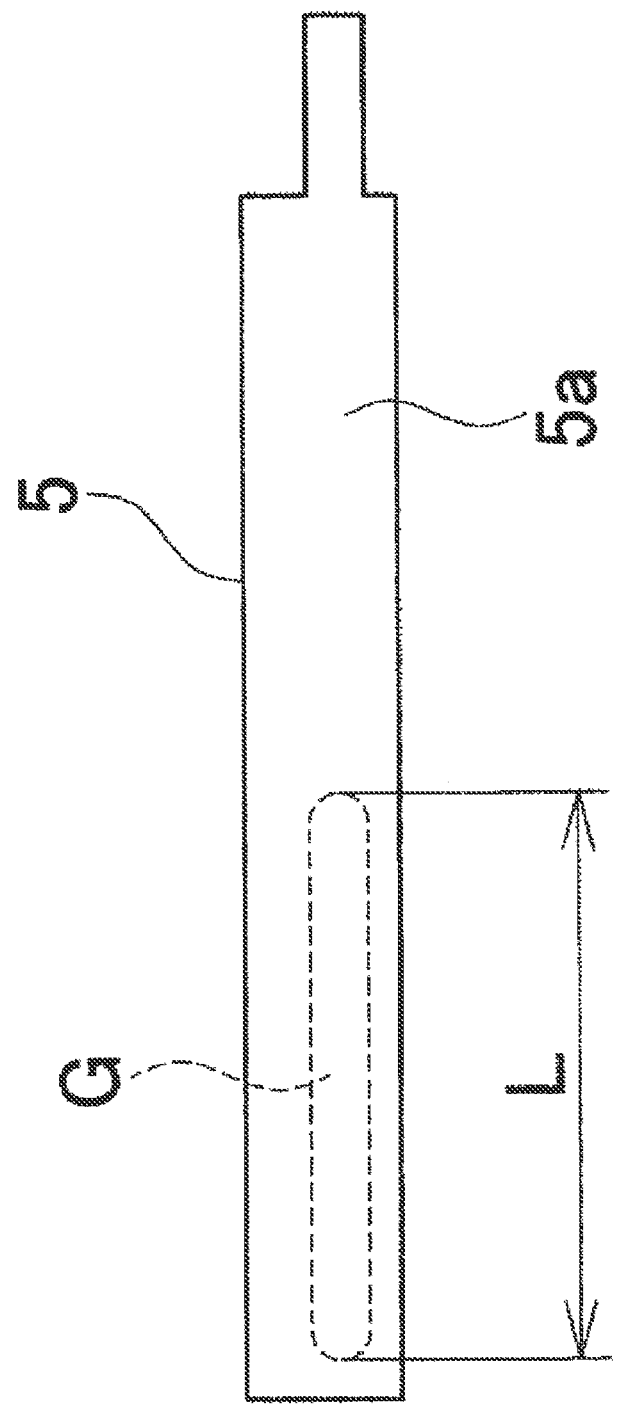

WIRE GRIP AND LIVE WIRE DISTRIBUTING TOOL HAVING THE WIRE GRIP

CROSS-REFERENCE TO RELATED APPLICATIONS

This application is a National Phase Application of PCT International Application No. PCT/JP2017/014714, International Filing Date Apr. 10, 2017, claiming priority of Japanese Patent Application No. JP 2016-081380, filed Apr. 14, 2016, which are hereby incorporated by reference.

BACKGROUND OF THE INVENTION

Field of the Invention

The present invention relates to a wire grip and a live wire distributing tool having the wire grip. More specifically, it relates to a wire grip used for cutting a live electric wire hanging between two utility poles, and a live wire distributing tool having the wire grip.

Background

As a method for cutting a live electric wire hanging between two utility poles (hereinafter, referred to as just "live wire"), a method for distributing a live wire has been traditionally known. In the method, a first wire grip and a second wire grip are arranged so that a part of the electric wire to be cut is interposed between two separate positions spaced apart with each other and so that the electric wire is gripped by the both first and second wire grips at one of the two separate positions and the other one of the two separate positions, respectively. Then, the both wire grips are connected to a pulling tool, respectively. This pulling tool allows the first and second wire grips to be pulled and the live wire to be loosened between the two separate positions, and allows the loosened live wire to be cut with a cutting tool. Such a method for distributing a live wire is disclosed in Japanese Unexamined Patent Application Publication No. 2000-083309 (see FIG. 9). In the method, wire grips (53, 54) are attached to both ends of an extendable rod (52), respectively, while the wire grip (53) on the one end is hooked on a side part of the part to be cut on the live wire (W) by use of the live wire distributing tool (51) rotatably connected to the extendable rod (52). Then, the extendable rod (52) is set along the live wire, and the other wire grip (54) is hooked on the other side of the part to be cut. Next, a remotely operable rod (55) is operated to retract the extendable rod (52). It allows the wire grips (53, 54) not only to strongly grip the live wire (W) but also to move close to each other to loosen the live wire (W) therebetween. The loosened live wire can be cut with a cutting tool (56).

However, the method for distributing a live wire described in Japanese Unexamined Patent Application Publication No. 2000-083309 had a drawback that since the wire grip (53) of the one end of the live wire distributing tool (51) is rotatably connected to the one end of the extendable rod (52), the wire grip (53) of the one end of the extendable rod (52) could hit the extendable rod (52) and a surrounding equipment, etc. due to inadvertent swinging motion of the wire grip (53) during transportation to a workplace of or preparation of the live wire distributing tool (51), and thus could damage itself or the surrounding equipment, etc.

Japanese Unexamined Patent Application Publication No. 2010-088256 discloses a live wire distributing tool that overcomes the drawback of Japanese Unexamined Patent Application Publication No. 2000-083309. According to the Document, a first electric wire grasping part and a second electric wire grasping part are arranged on both ends of an extendable rod, respectively, a first connecting means to swingably connect to one end of the extendable rod a grasping mechanism in between a position along an axial center direction of the extendable rod and an approximately 90° bent position is provided on the first electric wire grasping part, a braking means to provide a braking force to the arbitrary swing of the grasping mechanism is provided at the first connecting means, and a second connecting means to connect to the other end of the extendable rod the grasping mechanism in the position along the axial center direction of the extendable rod is provided on the second electric wire grasping part.

According to Japanese Unexamined Patent Application Publication No. 2010-088256, the grasping mechanism of the first electric wire grasping part is bent approximately 90° and is mounted to one side part to be cut of the live wire with the other end side of the extendable rod is being grabbed. Then, the other end of the extendable rod is raised to be along with live wire with a remotely operable rod and the grasping mechanism of the second electric wire grasping part is mounted to the other side of the part to be cut. After that, the extendable rod is contracted with the remotely operable rod. It allows the live wire to be strongly grasped by the grasping mechanisms of the first and second electric wire grasping parts, respectively, and allows the live wire between the electric wire grasping parts to loosen as the both electric wire grasping parts move close to each other. The loosened parts are cut with a cutting tool, which can help implement the cutting method with high work efficiency. Further, since the braking means is provided at the first connecting means that swingably connects the grasping mechanism of the first electric wire grasping part to the one end of the extendable rod, it can prevent the grasping mechanism from hitting the extendable rod and a surrounding equipment, etc. due to inadvertent swinging motion and prevent any damage to the grasping mechanism itself or the surrounding equipment, etc. Accordingly, it can prevent any trouble due to the inadvertent swinging motion of the grasping mechanism.

If the electric wire is kept to be pulled for two to three days, an insulation film of the electric wire gripped by the electric wire grasping part is stripped off, and an element wire is directly grasped by a pair of gripping parts of the electric wire grasping part. This applies to the both inventions in Japanese Unexamined Patent Application Publication No. 2000-083309 and Japanese Unexamined Patent Application Publication No. 2010-088256. However, the electric wire grasping parts are provided at the both sides of the extendable rod of the live wire distributing tool, respectively, and thus troublesome work, i.e., to measure the two insulation films of the electric wire to be grasped and strip the insulation films at a required length, is necessary. Furthermore, it is necessary to restore the stripped insulation film of the electric wire after the live wire distribution, which is very troublesome. Furthermore, there is a possibility that rain water could enter the restored parts and cause leakage of electricity if the parts are exposed to wind and rain for a long time.

Further, an electric wire grasping part which can hold an electric wire grasped without requiring any work to strip off an insulation film (see Japanese Patent No. 2948786 and No. 3015352, and Japanese Unexamined Patent Application Publication No. 2014-193085) is proposed. However, when the point where the force is applied (pivot 59) and the point of application (pivot 60) in the electric wire grasping part of Japanese Patent No. 2948786 and Japanese Patent No. 3015352 are located on a vertical line, as shown in FIG. 10, a pulling force of a connecting member (50) does not effectively act as a pushing-up force of a movable-side gripping part (53) and thus cannot surely grasp an electric wire (54) when the electric wire (54) is thin.

Japanese Unexamined Patent Application Publication No. 2004-304969 discloses an electric wire grasping part that overcomes the drawbacks of Japanese Patent No. 2948786 and Japanese Patent No. 3015352. According to Japanese Unexamined Patent Application Publication No. 2004-304969, a locking piece exerts a remarkably larger suppressing force on a core wire compared with a locking part consisting of a conical spike provided on the conventional electric wire grasping part, since a linear tooth part bent at a radius of curvature corresponding to an outer peripheral surface of the core wire bites into the core wire in a direction orthogonal to an axis line of the core wire. Accordingly, if the electric wire is left pulled for two to three days and any impact force is applied on the electric wire grasping part due to some cause, each locking piece slightly biting into the core wire can prevent the electric wire from coming off from both gripping parts. Thus, there is no possibility that any trouble such as the electric wire coming off from both gripping parts will occur. Moreover, the locking piece exerts a larger suppressing force on the core wire just by making its tooth part slightly bite into the core wire, and thus could do less damage to the core wire, compared with a locking part consisting of a spike which bites into an element wire of a core wire, reaching to a depth of one third of a core wire diameter. Furthermore, when this electric wire grasping part is used, a step of stripping off the insulation film of the electric wire is not necessary. In addition, the conventional wire grip requires a very troublesome work to precisely identify a position of a core wire of an electric wire when a hot puller grasps (chucks) the electric wire.

Further, a wire grip shown in FIG. 11 and FIG. 12 has been known conventionally. The wire grip comprises an upper grasping part (52); a lower grasping part (53) parallel to the upper grasping part (52); wherein a pair of links (51A, 51B) are rotatably connected via a pair of spikes (58, 58) to the upper grasping part (52) and the lower grasping part (53), respectively, wherein one end of a male screw (M) is fixed at the spike (58) of an upper grasping part (52) side of the link (51A), and wherein a female screw (F) is provided at the link (51B) to be screwed with the male screw (M); and a rod-like body (50) rotatably provided at ends (59, 59) of a pair of links (51A, 51B).

When the male screw (M) is tightened, the male screw (M) rotates about the spike (58) in a clockwise direction and moves closer to the lower grasping part (53), as shown in FIG. 12.

This wire grip has drawbacks that as the tightening force of the male screw (M) (a force in a longitudinal direction of the male screw (M)) is not sufficiently strong as it is dispersed into a vertical directional component and a horizontal directional component and that an uniform gripping force (the tightening force) is not obtained in the electric wire grasped between the upper grasping part (52) and the lower grasping part (53) parallel to the upper grasping part (52).

SUMMARY OF THE INVENTION

The invention described in Japanese Unexamined Patent Application Publication No. 2010-088256 requires an operation step of mounting of the grasping mechanism of the first electric wire grasping part which is bent approximately 90° to one side part to be cut of the live wire with the other end side of the extendable rod being grabbed. It forces an operator in an unnatural posture. Furthermore, the invention has a drawback that it has more complicated structures as it requires a braking means to be provided at the first connecting means that swingably connects the grasping mechanism of the first electric wire grasping part to one end of the extendable rod. The invention described in Japanese Unexamined Patent Application Publication No. 2004-304969 has a drawback that whether the electric wire comes off from both gripping parts depends on each locking piece slightly biting into the core wire, and thus it is difficult to objectively determine if the locking piece slightly bites into the core wire.

The present invention overcomes the drawbacks of the wire grip described in Japanese Unexamined Patent Application Publication No. 2000-083309, No. 2010-088256, and No. 2004-304969, Japanese Patent No. 2948786 and No. 3015352, and Japanese Unexamined Patent Application Publication FIGS. 11 to 12. It enables easy and secure grasping (gripping) to an electric wire and provides a strong gripping force (tightening force). It further aims to provide a wire grip with less components and a live wire distributing tool having this wire grip.

Means for Solving the Problems

A first aspect of the present invention relates to a wire grip comprising:

an upper grasping part provided at a base for grasping an electric wire from above;

a lower grasping part arranged to face the upper grasping part with the electric wire interposed therebetween and provided to be movable in a vertical direction with respect to the base;

an arrow part provided at a bottom part of the lower grasping part integrally with the lower grasping part or as a separate body;

a supporting body arranged on a side opposite to the lower grasping part with the arrow part interposed therebetween, wherein the supporting body pushes the arrow part by a screw screwed with a lower supporting part provided at a bottom part of the base and extending in a longitudinal direction of the base; and a holding part for holding the lower grasping part to prevent it from being spaced from the base.

Preferably, the holding part comprises:

a hollow part formed at the lower grasping part, wherein the arrow part is movably fitted into the hollow part;

two legs allowing the lower grasping part to cross the base; and a guide part to connect the two legs via the base, wherein the arrow part is provided at the bottom part of the lower grasping part as a separate body, and wherein the base is provided to extend in a vertical direction to an extending direction of the upper grasping part.

Further, the holding part comprises a holding plate attached to the lower supporting part and extending in a longitudinal direction of the base, wherein the arrow part is movably fitted into a space defined by the base and the lower supporting part, wherein the arrow part is provided at the bottom part of the lower grasping part integrally with the lower grasping part, and wherein the base is provided to extend obliquely to an extension direction of the upper grasping part.

Further, a plurality of spikes are preferably provided on a surface of the lower grasping part opposed to the upper grasping part.

A second aspect of the present invention relates to a live wire distributing tool having two wire grips described in the first aspect, wherein an electric wire is gripped by the two wire grips spaced from each other, wherein an arrow part of one of the two wire grips is connected to one end of an extendable rod, and wherein an arrow part of the other one of the two wire grips is connected to the other end of the extendable rod.

Effect of the Invention

The wire grip according to the first aspect of the present invention comprises an upper grasping part provided at a top part of a base for grasping an electric wire from above; a lower grasping part arranged to face the upper grasping part with the electric wire interposed therebetween and provided to be movable in a vertical direction with respect to the base; an arrow part provided at a bottom part of the lower grasping part integrally with the lower grasping part or as a separate body; a supporting body arranged on a side opposite to the lower grasping part with the arrow part interposed therebetween, wherein the supporting body pushes the arrow part by a screw screwed with a lower supporting part provided at a bottom part of the base and extending in a longitudinal direction of the base; and a holding part for holding the lower grasping part to prevent it from being spaced from the base, and thus has a remarkable effect that enables easy and secure grasping (gripping) to an electric wire and requires less components.

In addition, the wire grip has another advantage of further improving workability by having additional structures; the holding part comprises a holding plate attached to the lower supporting part and extending in a longitudinal direction of the base, the arrow part is movably fitted into a space defined by the base and the lower supporting part, the arrow part is provided at a bottom part of the lower grasping part integrally with the lower grasping part, and the base is provided to extend obliquely to an extension direction of the upper grasping part.

The live wire distributing tool according to the second aspect of the present invention as being a live wire distributing tool having two wire grips described in the first aspect, has following structures; an electric wire is gripped by the two wire grips spaced from each other, an arrow part of one of the two wire grips is connected to one end of an extendable rod, and an arrow part of the other one of the two wire grips is connected to the other end of the extendable rod; and enables easy and secure grasping (gripping) to an electric wire and eliminate the necessity of stripping off an insulation film of the electric wire and taping process after construction.

BRIEF DESCRIPTION OF THE DRAWINGS

FIG. 2(a)-(c) illustrate a state before a wire grip according to the other embodiment of the present invention is attached to an electric wire, wherein FIG. 2(a) illustrates a front view, 2(b) illustrates a right side view, and 2(c) illustrates a top view, respectively.

FIG. 3(a)-(c) illustrate a state that the wire grip of FIG. 1 is attached to an electric wire, wherein FIG. 3(a) illustrates a front view, and 3(b) illustrates a right side view, and FIG. 3(c) illustrates a rear view, respectively.

FIG. 4(a)-(b) illustrate a state that an arrow part of the wire grip in FIGS. 2(a)-(c) and 3(a)-(b) is connected to an extendable rod, wherein FIG. 4(a) illustrates a state before the extendable rod is pulled, and 4(b) illustrates a state that the extendable rod is pulled.

FIG. 5(a)-(b) illustrates an arrow part which constitutes the wire grip of the present invention, wherein FIG. 5(a) illustrates a top view, and 5(b) illustrates a side view, respectively.

FIG. 8(a)-(c) illustrate a wire grip according to the still other embodiment of the present invention, wherein FIG. 8(a) illustrates a front view of the wire grip, 8(b) illustrates a line A-A sectional view in 8(a), and 8(c) illustrates a line B-B sectional view in 8(a).

DETAILED DESCRIPTION OF THE INVENTION

With reference to the drawings, a wire grip of the present invention and a live wire distributing tool using the wire grip are described in detail below.

Figure 1:
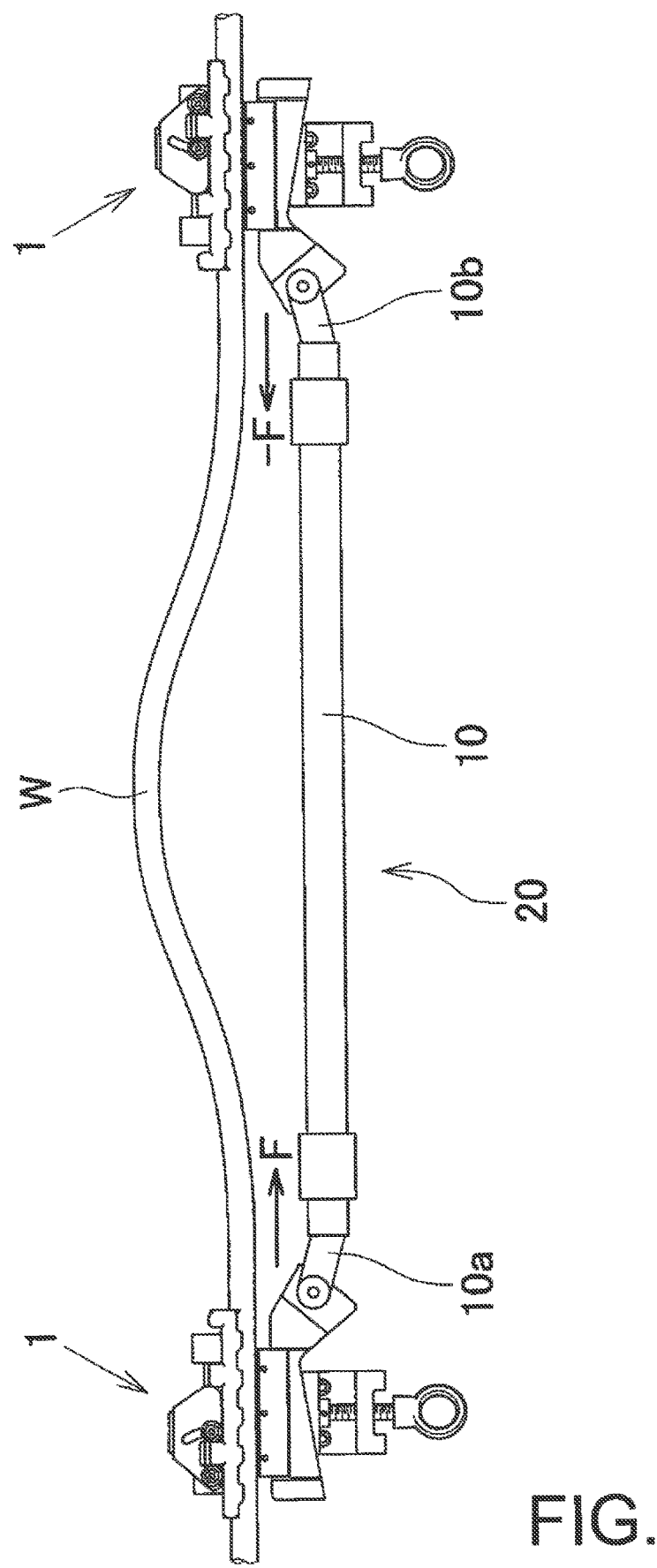
FIG. 1 illustrates a live wire distributing tool having a wire grip according to an embodiment of the present invention.
Figure 2A:
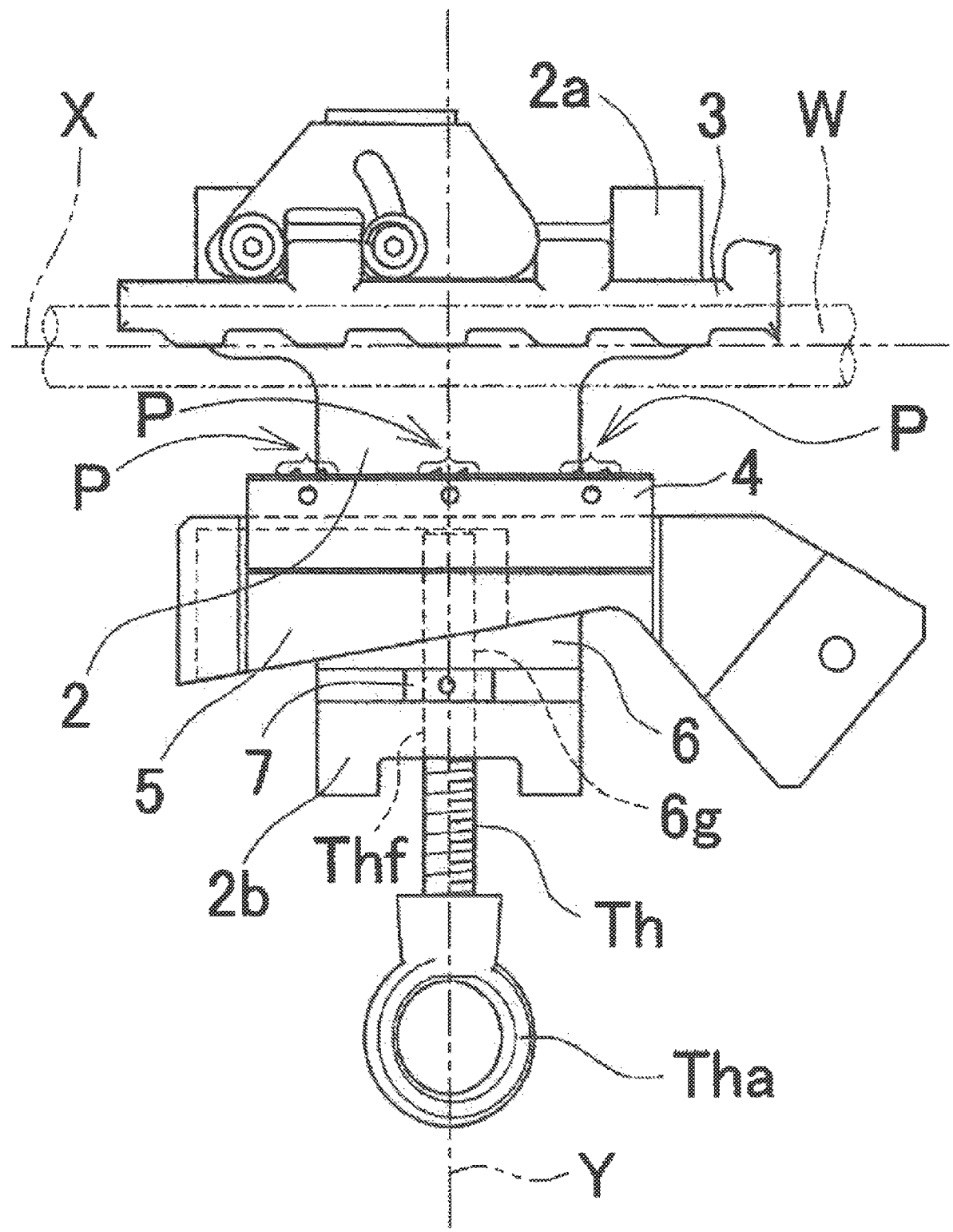
Figure 2B:
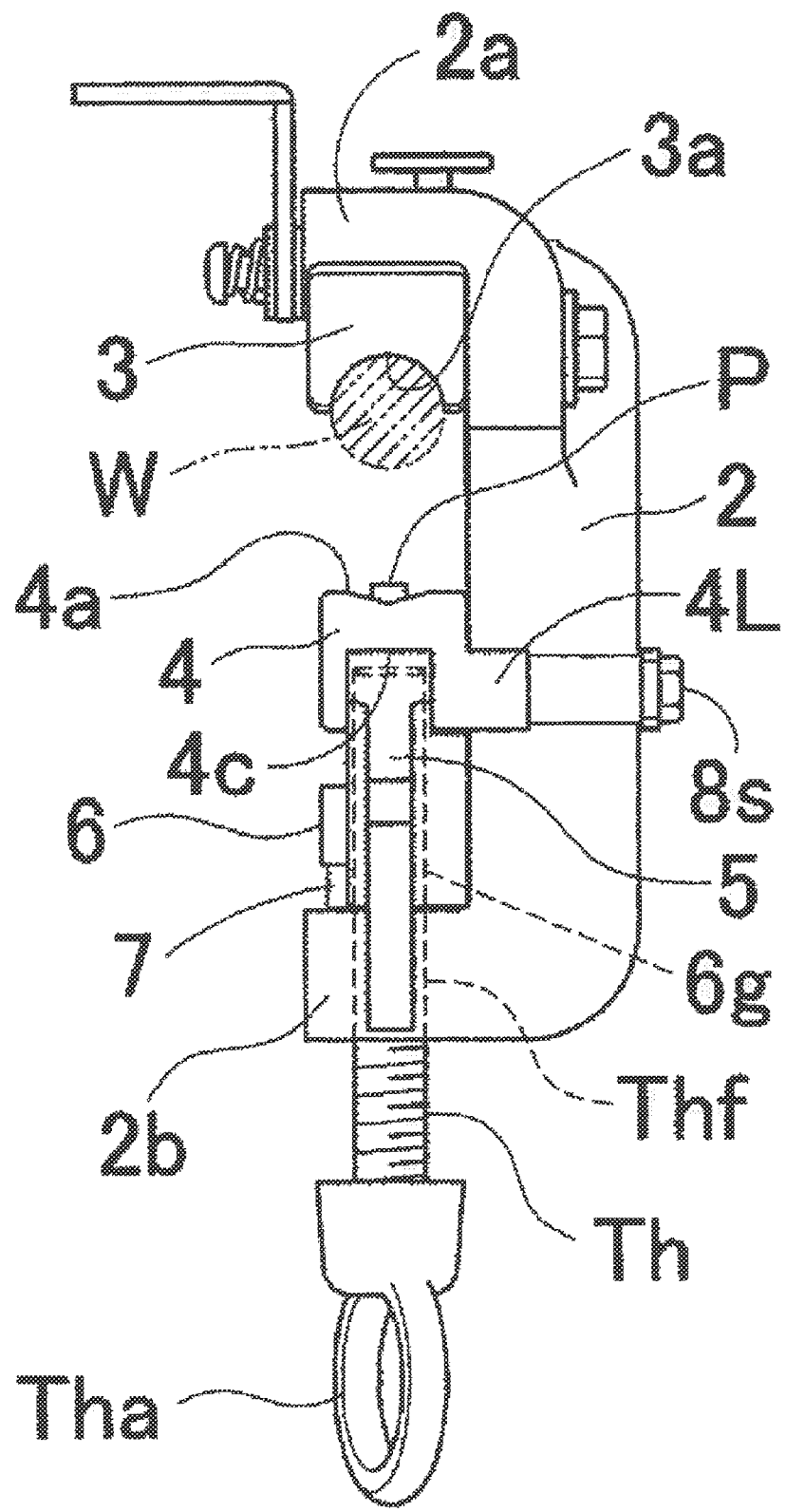
Figure 2C:
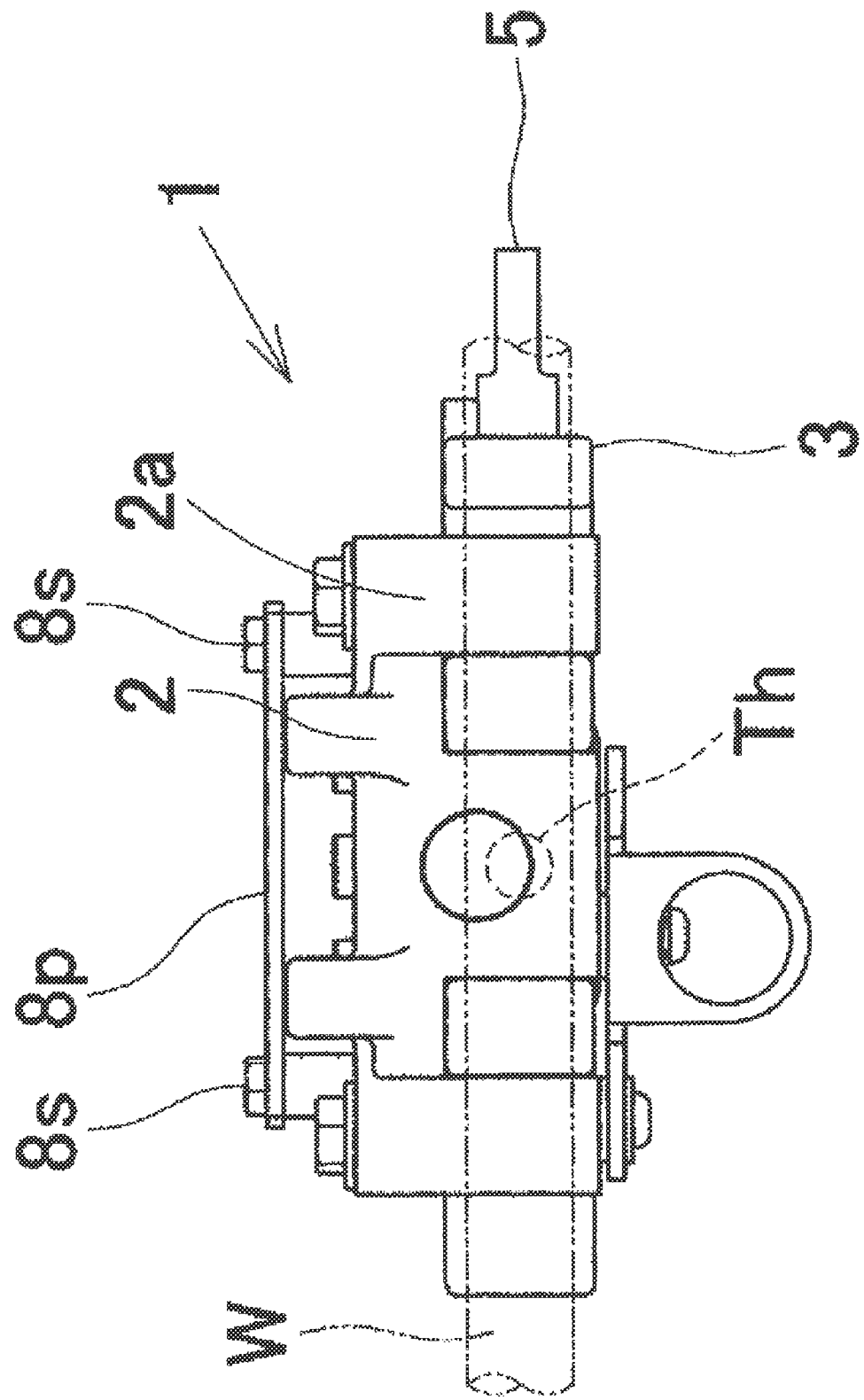
Figure 3A:
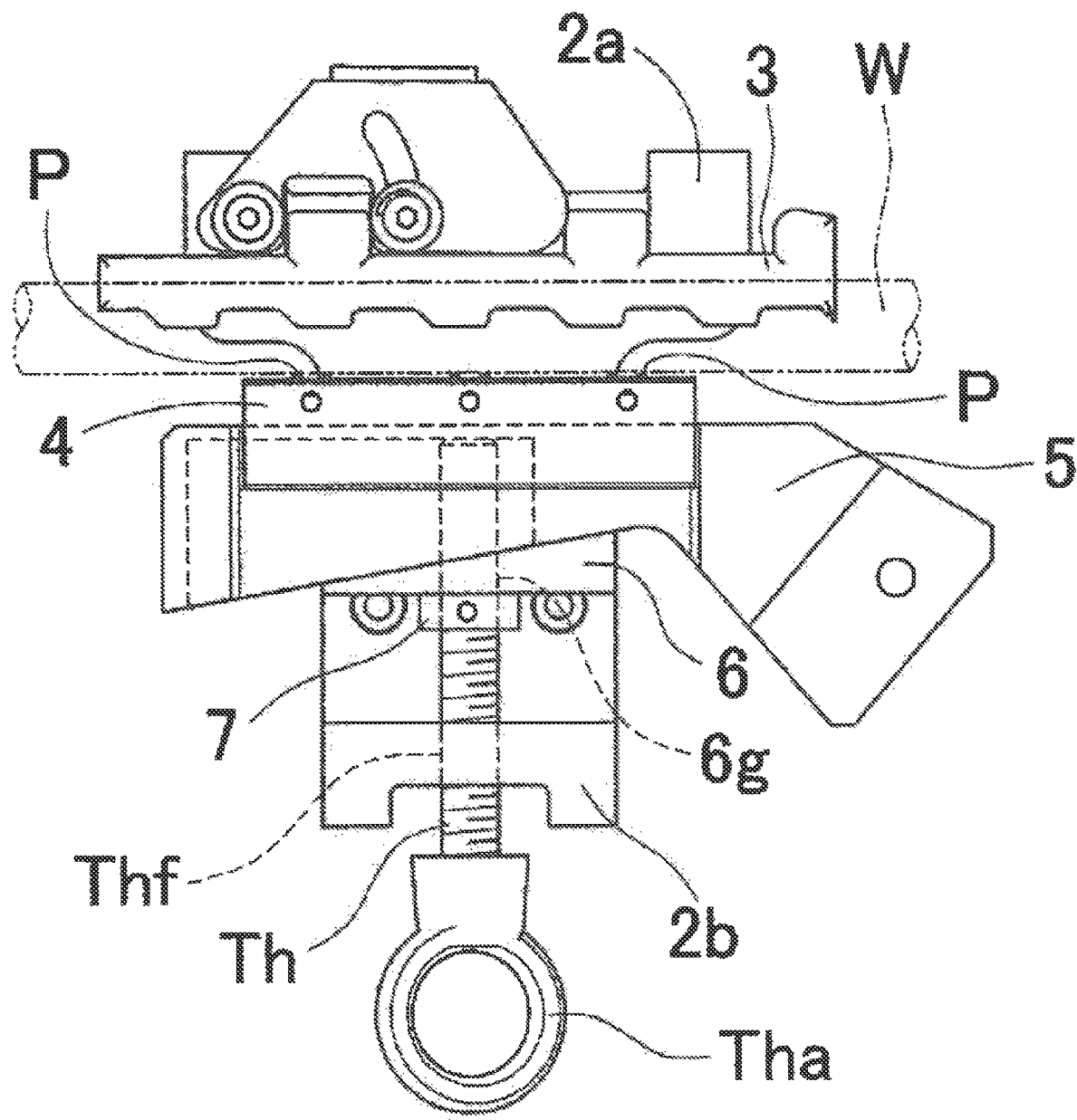
Figure 3B:
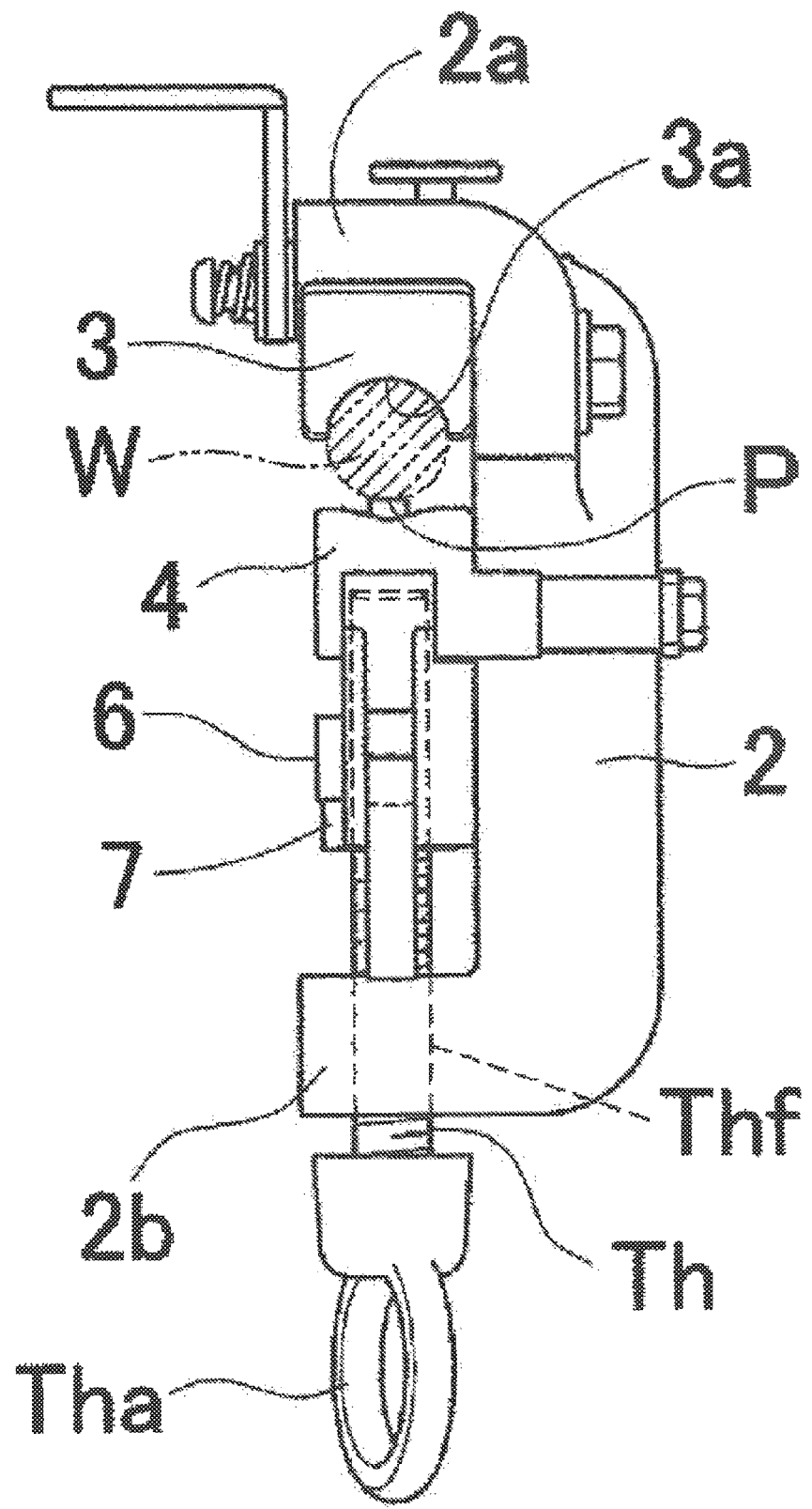
Figure 3C:
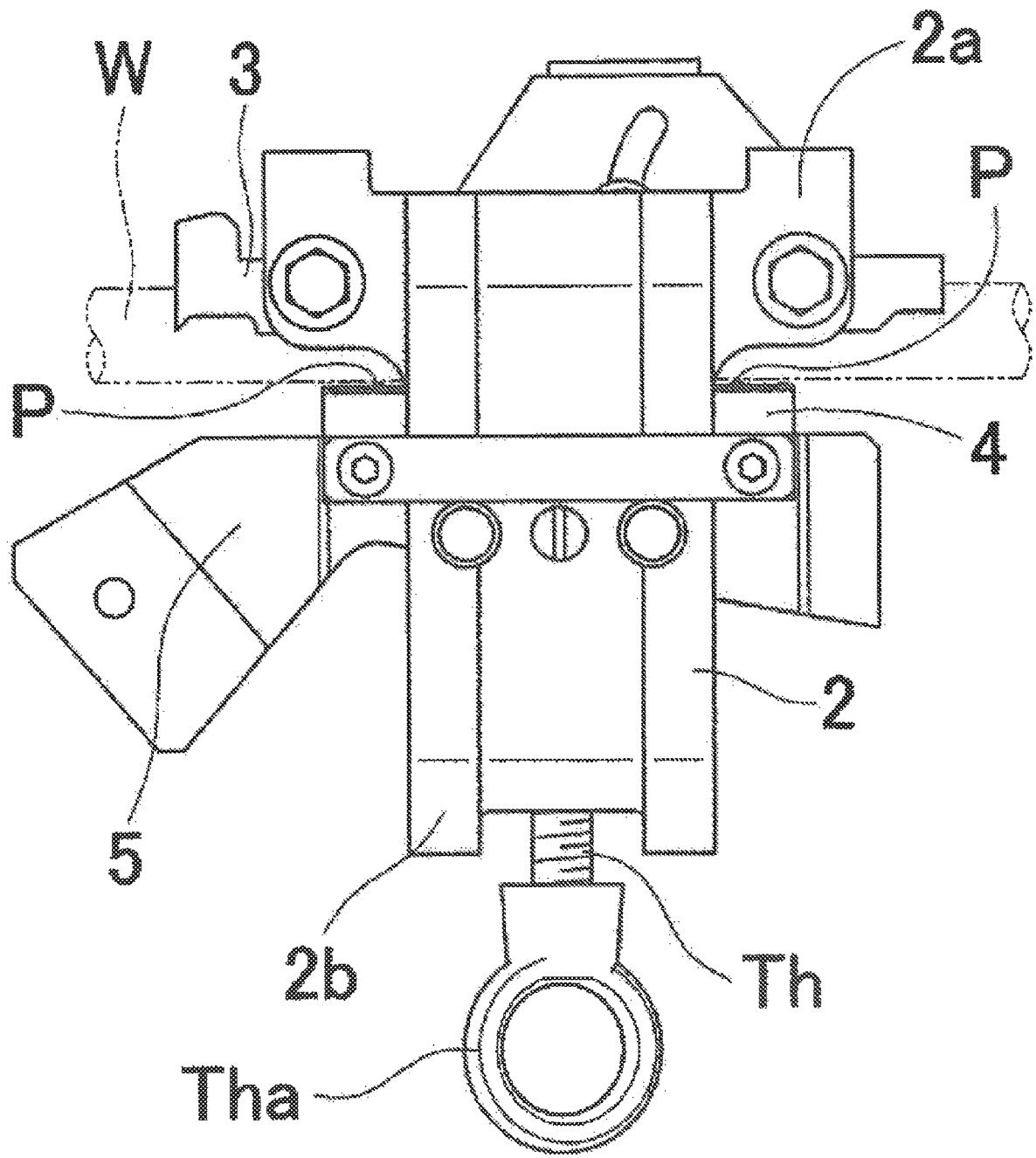
Figure 4A:
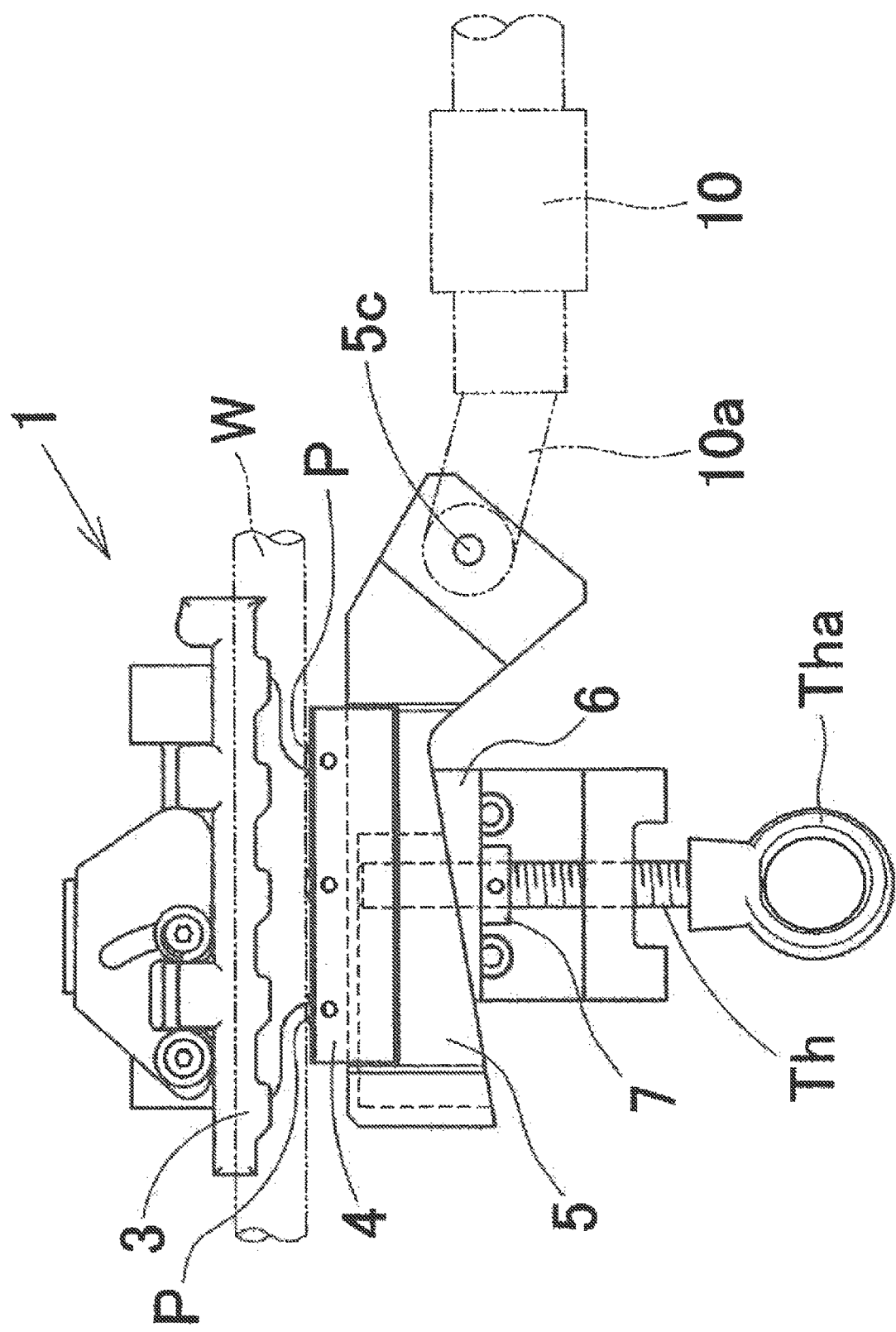
Figure 4B:
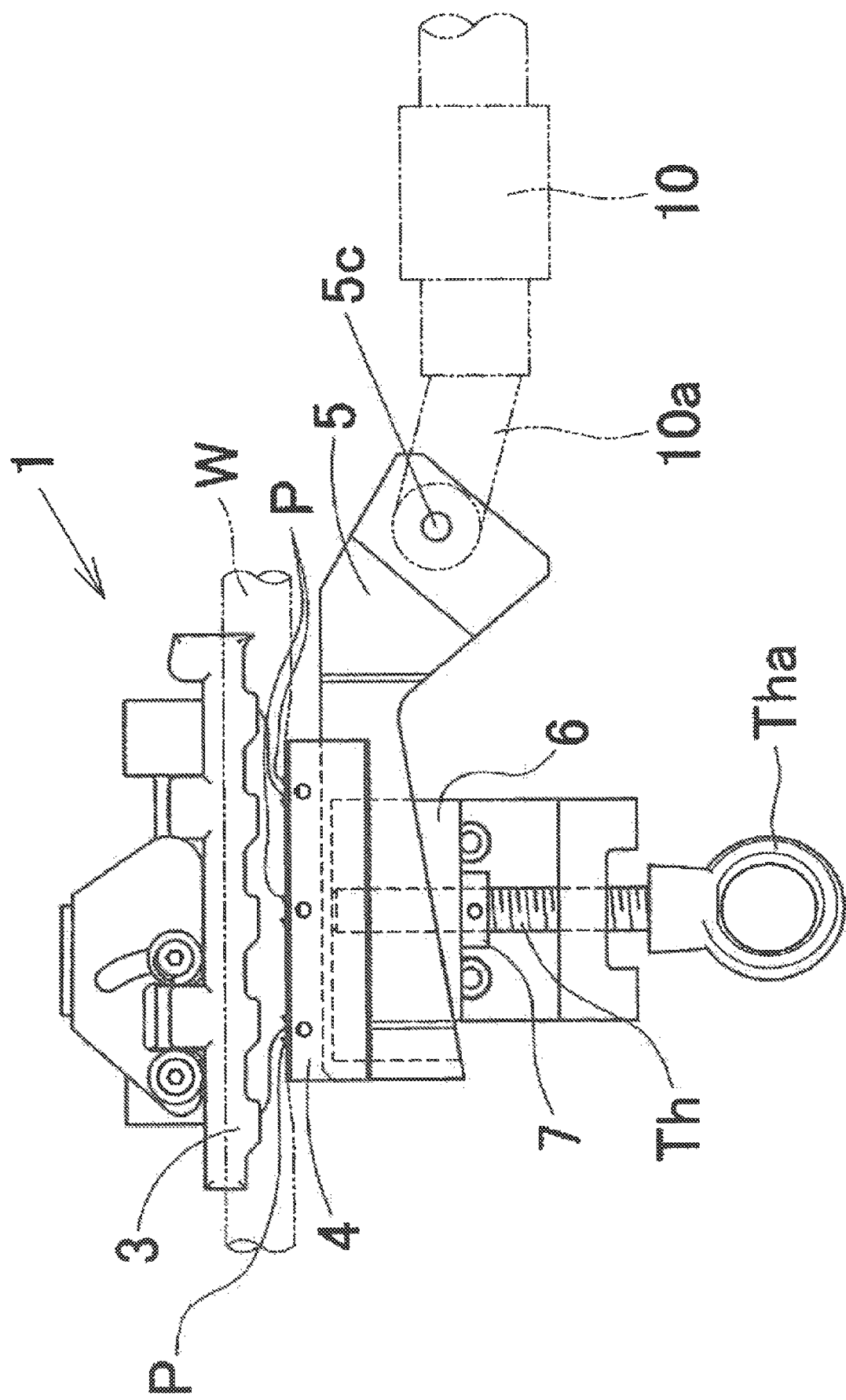
Figure 5B:
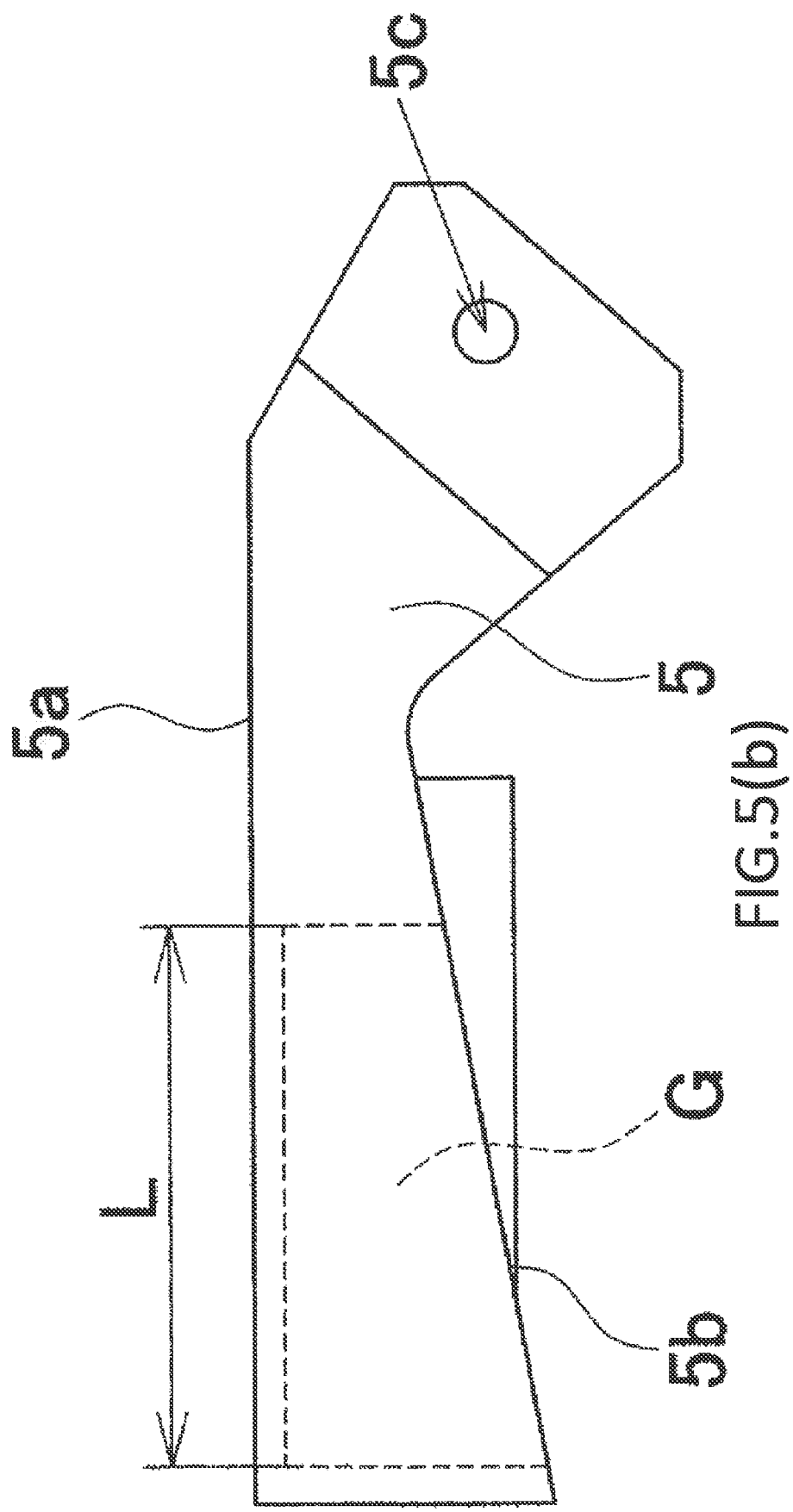
Figure 6:
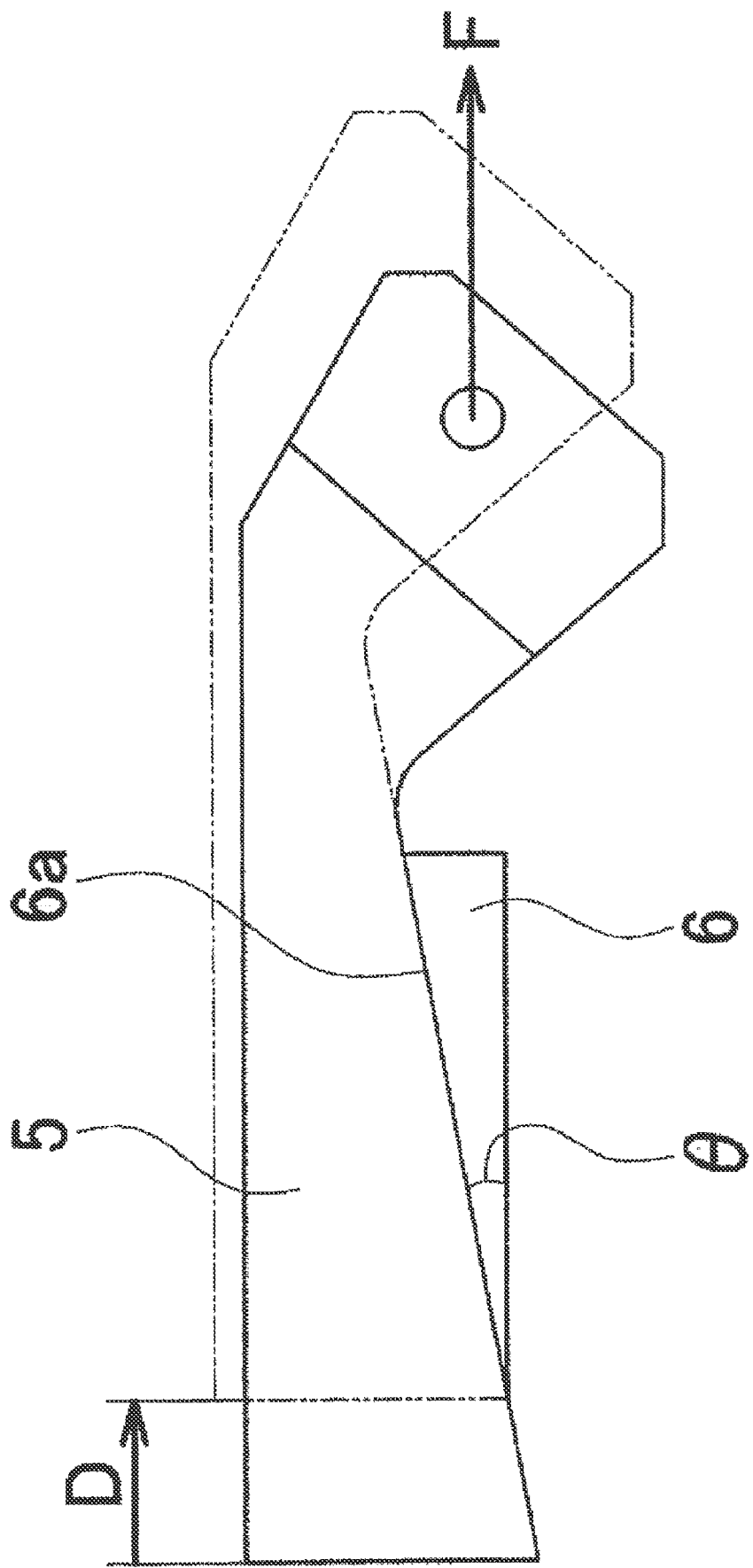
FIG. 6 illustrates an action effect of the arrow part of the present invention.

FIG. 1 illustrates a live wire distributing tool having a wire grip according to an embodiment of the present invention. FIG. 2(a)-(c) illustrate a state before a wire grip according to the other embodiment of the present invention is attached to an electric wire, wherein FIG. 2(a) illustrates a front view, 2(b) illustrates a right side view, and 2(c) illustrates a top view, respectively. FIG. 3(a)-(b) illustrate a state that the wire grip of FIG. 1 is attached to an electric wire, wherein FIG. 3(a) illustrates a front view, and 3(b) illustrates a right side view, respectively. FIG. 4(a)-(b) illustrate a state that an arrow part of the wire grip of FIGS. 2(a)-(c) and 3(a)-(b) is connected to an extendable rod, wherein FIG. 4(a) illustrates a state before the extendable rod is pulled, and 4(b) illustrates a state that the extendable rod is pulled. FIG. 5(a)-(b) illustrates an arrow part which constitutes the wire grip of the present invention, wherein FIG. 5(a) illustrates a top view, and 5(b) illustrates a side view, respectively. FIG. 6 illustrates an action effect of the arrow part of the present invention.

Embodiment 1

With reference to FIGS. 1 to 5, the wire grip according to the first embodiment of the present invention is described. The wire grip (1) of the present embodiment comprises: an upper grasping part (3) for grasping an electric wire (W) from above; a lower grasping part (4) which is arranged such that the lower grasping part (4) is opposed to the upper grasping part (3) and the electric wire (W) is interposed between the upper grasping part (3) and the lower grasping part (4), wherein the lower grasping part (4) is movably provided to a base (2); an arrow part (5) which is arranged directly under the lower grip part (4), wherein the arrow part (5) comprises a plane (5a) laterally extending with the lower grasping part (4) abutting and an inclined plane (5b), wherein an elongate hole (G) is drilled at the arrow part (5), wherein a screw (Th) freely movably provided to the base (2) in a vertical direction of the base (2) is inserted into the elongate hole (G) without abutting to the lower grasping part (4), and wherein the arrow part (5) is laterally and vertically movable relative to the base (2); and a supporting body (6) comprising an inclined plane (6a) abutting to the inclined plane (5b) of the arrow part (5), wherein a hole (6g) is drilled at the supporting body (6), wherein the screw (Th) is inserted into the hole (6g), wherein the supporting body (6) is supported with an annular member (7) which is inserted and fixed by the screw (Th). Now referring to FIG. 5(a)-(b), the elongate hole (G) is drilled over a length (L) in the lateral direction of the arrow part (5).

Now referring to FIG. 2(a), the upper grasping part (3) in this embodiment extends in a direction to an X axis of an XY coordinate system (orthogonal coordinate system), and the base extends in a direction to a Y axis.

Figure 7:
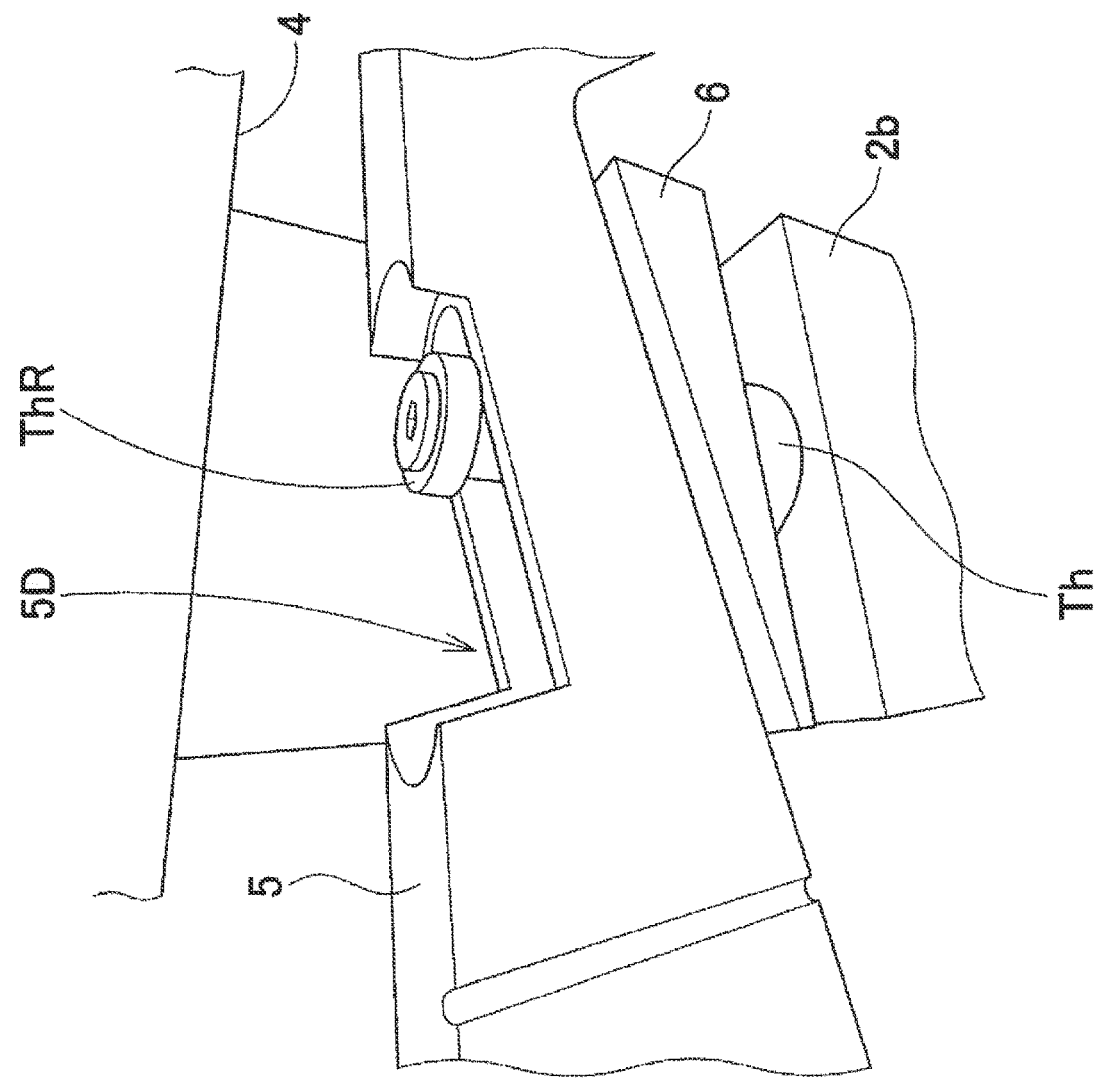
FIG. 7 is a perspective view illustrating a variation of the embodiment of the arrow part of the present invention.

In the examples illustrated in FIGS. 1 to 6, the elongate hole (G) does not penetrate the upper plane of the arrow part (5). That is, the elongate hole (G) of the arrow part (5) of the present invention is a groove scooped upward from the inclined plane (5b) in the bottom of FIG. 5(a)-(b) by a length (L) without penetrating the upper plane (5a). However, this structure may not be essential. For example, as illustrated in FIG. 7, the present embodiment also includes a structure that a notch (5D) is provided at a part of the arrow part (5) and a fall protection ring (ThR) is provided at the head of the screw (Th). The embodiment illustrated in FIG. 7 has an advantage that the arrow part (5) and the supporting body (6) do not fall from the base (2) even if the screw (Th) is loosen when the gripped electric wire (W) is removed from the wire grip (1). Moreover, in this embodiment, holding parts (4L, 8p, 8s) are formed at the lower grasping part (4), the holding parts comprise a hollow part (4c) into which the arrow part (5) is movably fitted, two legs (4L) allowing the lower grasping part (4) to cross the base (2), and a guide part (8p) to connect the two legs (4L) via the base (2).

FIG. 6 is now referred. The inclination angle of the inclined plane (6a) of the supporting body (6) is represented as θ, and it is assumed that the supporting body (6) is fixed. When a force F moves the arrow part (5) by a distance D in a right direction in the figure, a work load is represented as F·D. On the other hand, the upward (vertical) moving distance of the arrow part (5) in the figure is represented as D·sin θ.

Referring to FIG. 2(b), a plurality of spikes (P) are provided on a surface (4a) of the lower grasping part (4) opposed to the upper grasping part (3). FIG. 2(a) shows six spikes (P), but the number of spikes (P) is not limited to six and may be suitably decided according to a kind of an electric wire to which the wire grip (1) of the embodiment is applied. Referring to FIG. 6, suppose that a force of the arrow part (5) in an upper direction (vertical direction) on the page is set to be X. Accordingly, a work load will be X·D·sin θ and thus X=F/sin θ. θ will 0<θ<π/2, and thus sin θ<1. Accordingly, it gives X>F and thus the force X of the arrow part (5) in an upper direction (vertical direction) on the page increases compared with a force (a pulling force) F of the arrow part (5) in a right direction on the page.

Then, referring to FIG. 2(b), in the present embodiment, an upper supporting part (2a) and a lower supporting part (2b) are provided at a top part and a bottom part of the base (2), respectively, in a vertical direction to the base (2). FIG. 2 illustrates, but not limited to, that the upper supporting part (2a) and the lower supporting part (2b) are provided integrally with the base (2). For example, another structure where the upper supporting part (2a) and the lower supporting part (2b) are welded and joined to the base (2) may be adopted.

In this embodiment, the upper grasping part (3) is movably/removably attached to the upper supporting part (2a), a female screw (Thf) is threadedly provided on the lower supporting part (2b), and a screw (Th) is screwed with the female screw (Thf). An eye (Tha) is formed at the lowermost part of the screw (Th). An operator tightens or loosens the screw (Th) using a rod tool (not shown).

The wire grip (1) of the embodiment comprises such structures and thus the attachment of the wire grip (1) to the electric wire (W) is performed as follows, unlike the attachment of a conventional wire grip having a linkage mechanism.

(1) First, referring to FIG. 1, two wire grips (1) are attached to an electric wire (W) simultaneously with the use of a tool (for example, from a bottom direction on the page). Then, the eye is loosened by rotation with the use of a tool (an operation rod) as shown in FIG. 2(b) in order to open a gap the upper grasping part (3) and the lower grasping part (4) enough larger than the diameter of the electric wire (W).

(2) An operator then fit the electric wire (W) into a recess (3a) of the upper grasping part (3) and tightens the screw (Th) by rotating the eye (Tha) using the tool. This moves up the screw (Th). With the rise of the screw (Th), the supporting body (6) supported by the annular member (7) also rises. The arrow part (5) in contact with the supporting body (6) and then the lower grasping part (4) in contact with the arrow part (5) also rise, and the spikes (P) provided at the lower grasping part (4) bite into a cover of the electric wire (W) (see FIG. 3(b)).

At this stage, the operator can no longer manually tighten the screw (Th). Unlike the conventional invention, the attachment of the wire grip to the electric wire (W) in this embodiment is performed by pushing the lower grasping part (4) to the upper grasping part (3) with the electric wire (W) held therebetween by tightening the screw (Th), and by allowing the spikes (P) to bite into the cover of the electric wire. Accordingly, the wire grip (1) is not detached from the electric wire (W) unless the screw (Th) loosens.

(4) Referring to FIG. 1 and FIG. 4(a)-(b) now, connecting parts (10a, 10b) provided at both ends of the well-known extendable rod (10) (see Japanese Unexamined Patent Application Publication No. 2010-088256 and No. 2004-304969) are simultaneously connected to eyes (5c) provided at each arrow part (5) of the two wire grips (1) through for example, pins (not shown) (see FIG. 4(a)).

When the arrow parts (5) of the two wire grips (1) and the extendable rods (10) are connected in that way, the extendable rod (10) is operated with a tool (not shown) to apply a pulling force F to one wire grip (1). A pulling force (−F) is applied to the other wire grip (1) in the same way. It loosens the electric wire between the two wire grips (1). This produces a force X of the arrow part (5) in an upper direction (vertical direction) on the page, as mentioned above. The force X increases compared with a force (a pulling force) F of the arrow part (5) in a right direction on the page, and thus the wire grip (1) is not detached from the electric wire (W). Accordingly, the wire grip (1) of the present invention has a remarkable effect of placing no load on the spikes (P) since even when the screw (Th) is tightened, or even when the arrow part (5) moves in a right/left direction, the lower grasping part (4) moves upward, not right or left.

Embodiment 2

Embodiment 2 of the present invention is a live wire distributing tool (20) with two wire grips (1) of the embodiment 1. The live wire distributing tool (20) is configured such that the two wire grips grip an electric wire separately from each other, an arrow part (5) of one of the two wire grips (1) is connected to an end of an extendable rod (10), and an arrow part (5) of the other one of the two wire grips (1) is connected to the other end of the extendable rod (10). It should be noted that the arrow parts (5) of the wire grips on a right and left side on the page are differently oriented. This is because it allows an operator to check if the two wire grips (1) are correctly mounted to the electric wire (W) by seeing the arrow part (5) of the wire grip (1) relative to the base (2) from the same eye direction.

Embodiment 3

Figure 8A:
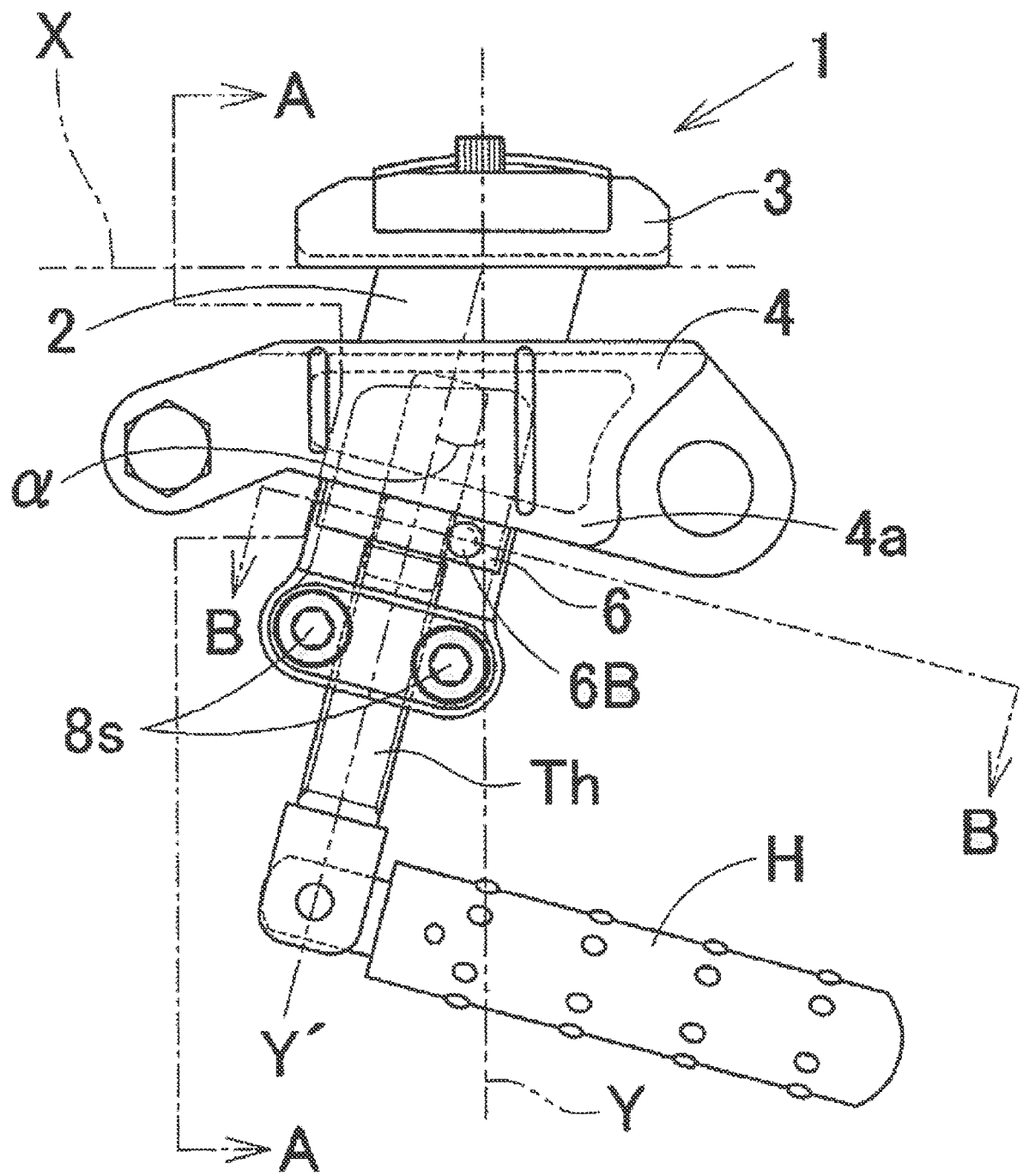
Figure 8B:
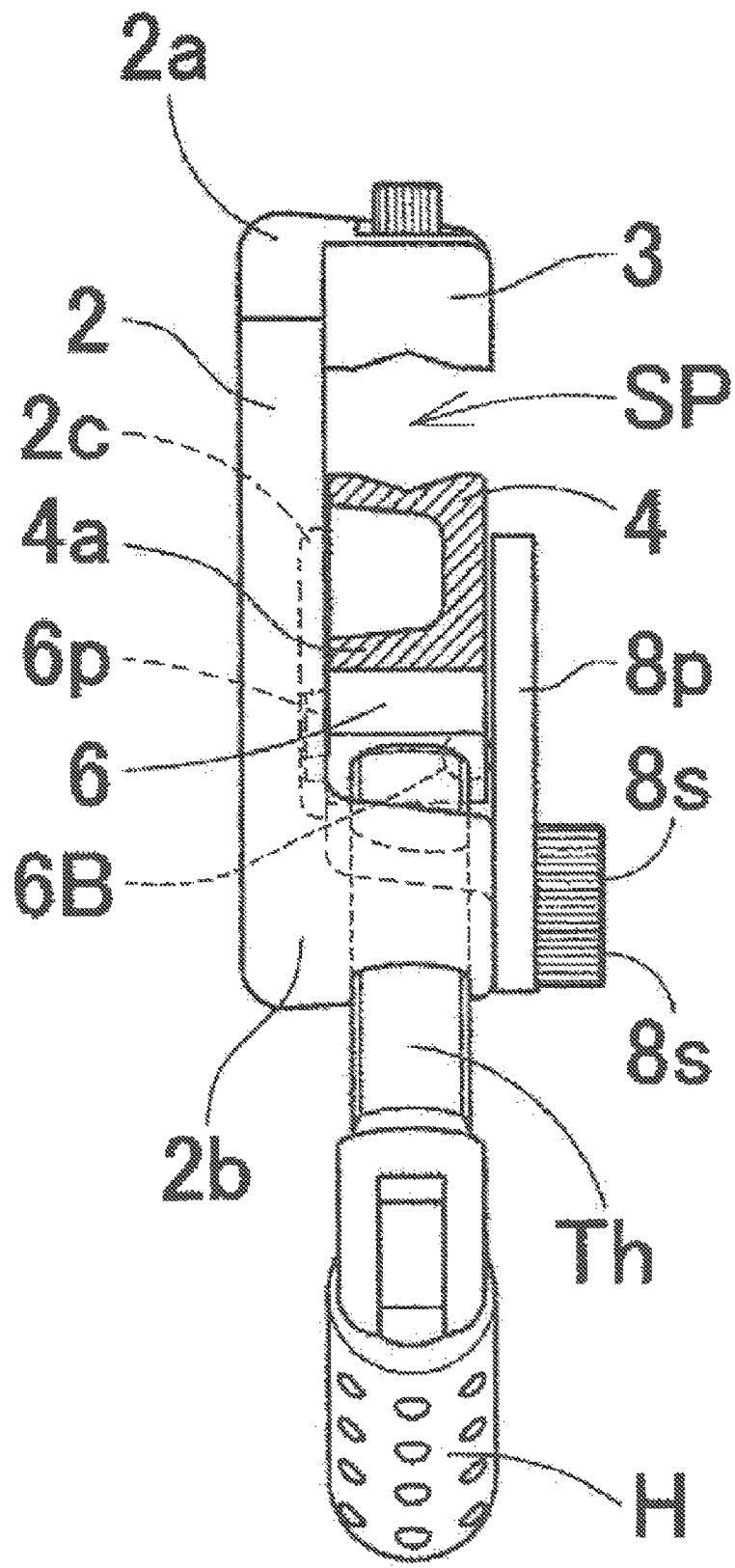
Figure 8C:
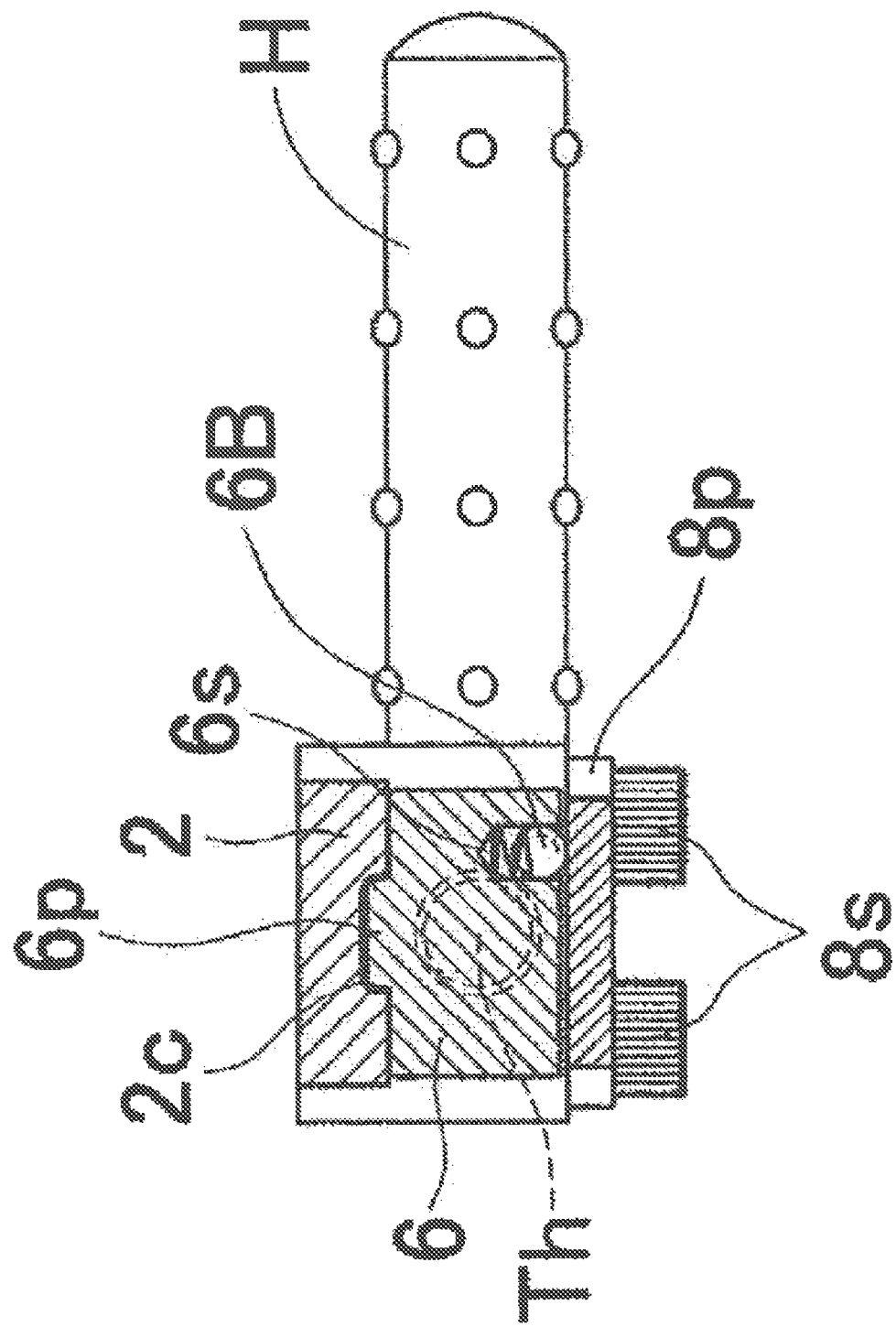
Figure 9:
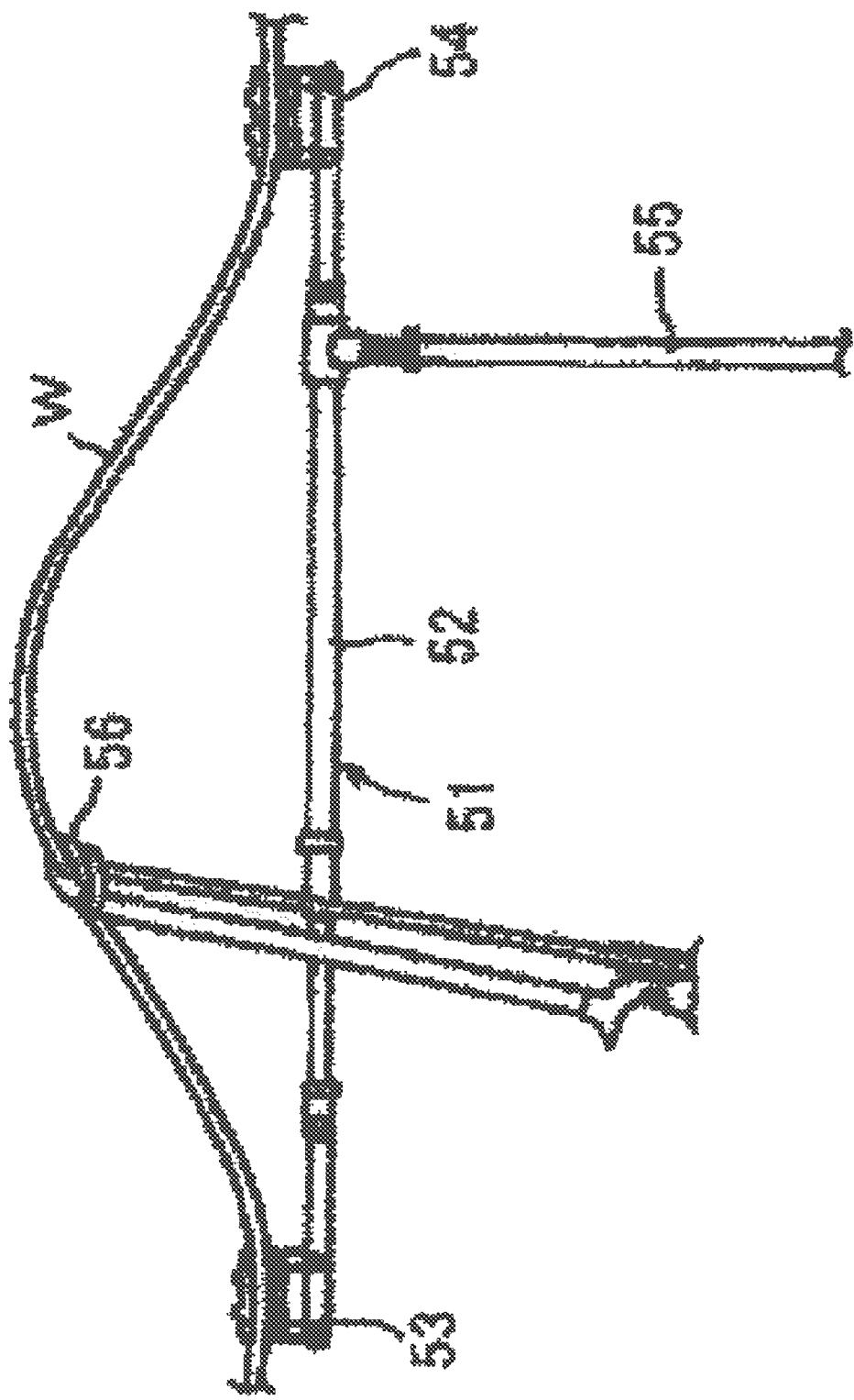
FIG. 9 illustrates a conventional live wire distributing tool.
Figure 10:
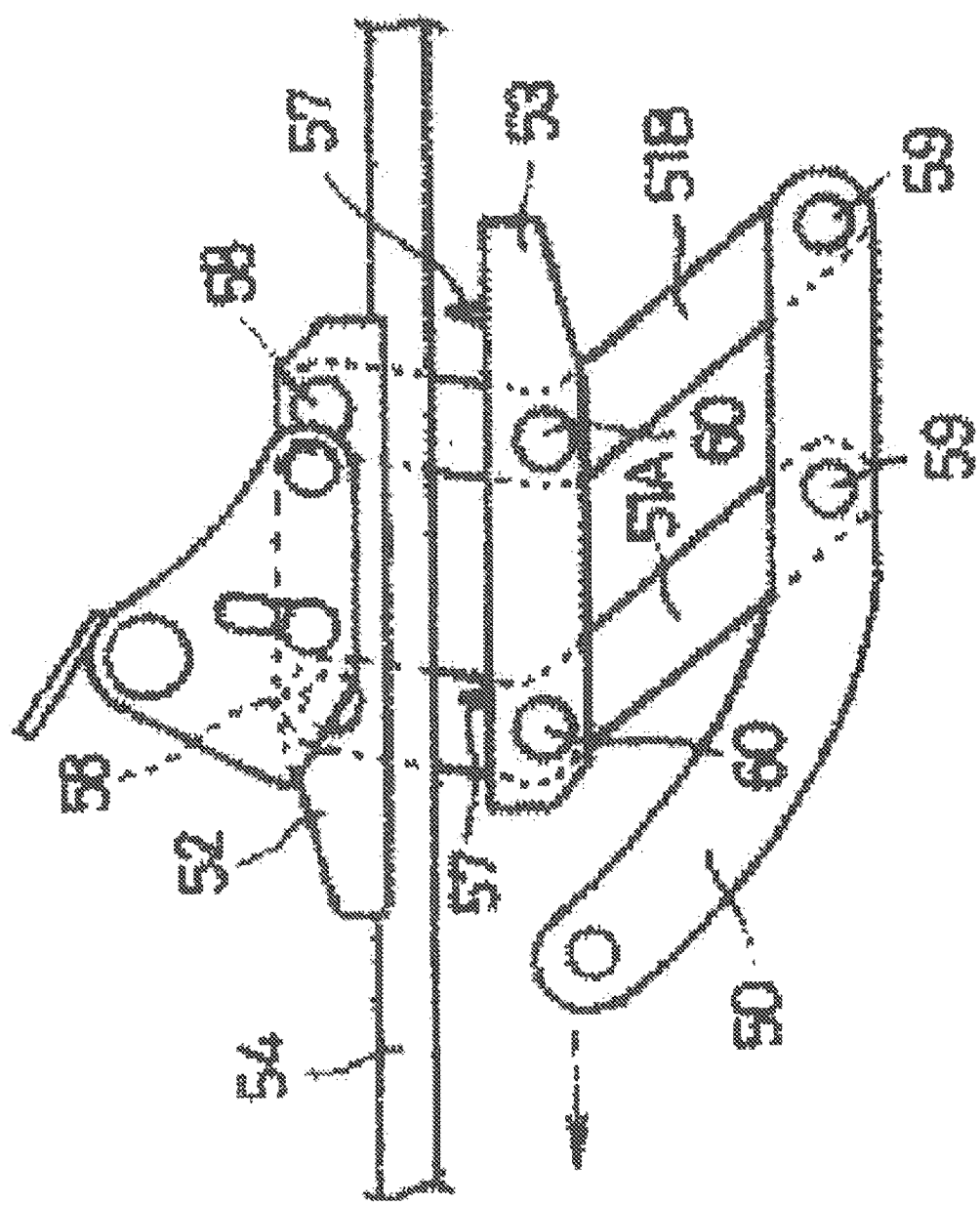
FIG. 10 illustrates a state before a wire grip used in the conventional live wire distributing tool is attached to electric wire.
Figure 11:
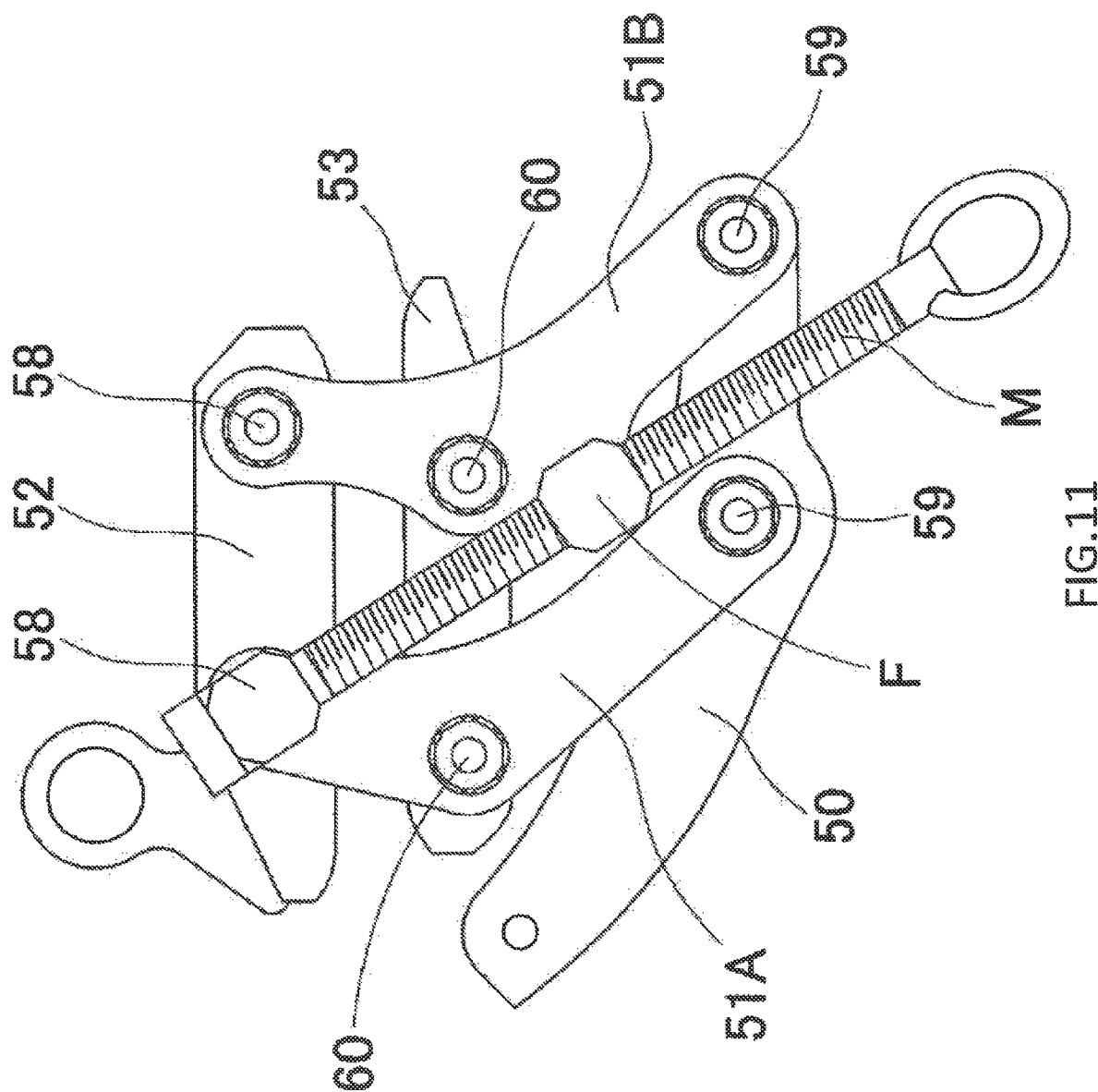
FIG. 11 illustrates a state before the grip action of the conventional wire grip.
Figure 12:
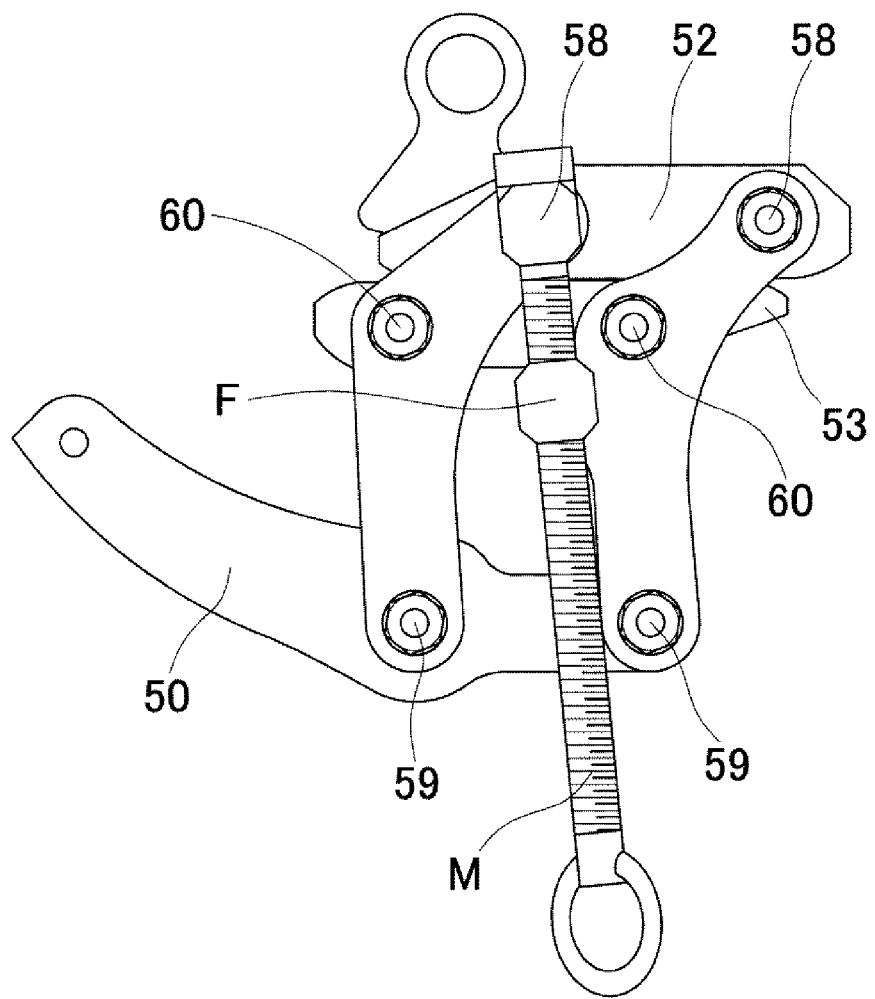
FIG. 12 illustrates a state of a grip action of the wire grip of FIG. 11.

Referring to FIG. 8(a)-(c), a wire grip (1) of this embodiment, as well as the wire grip (1) of the embodiment 1, comprises an upper grasping part (3) provided at a top part of a base (2) for grasping an electric wire from above; a lower grasping part (4) arranged to face the upper grasping part (3) with the electric wire interposed therebetween and provided to be movable in a vertical direction with respect to the base (2); an arrow part (4a) provided at a bottom part of the lower grasping part (4) integrally with the lower grasping part (4); a supporting body (6) arranged on a side opposite to the lower grasping part (4) with the arrow part (4a) interposed therebetween, wherein the supporting body (6) pushes the arrow part (4a) by a screw screwed with a lower supporting part (2b) provided at a bottom part of the base (2) and extending in a longitudinal direction of the base (2); a holding part (8p, 8s) for holding the lower grasping part (4) to prevent it from being spaced from the base (2). Referring to FIG. 8(a)-(c) now, the upper grasping part (3) in this embodiment extends in an X axis direction of an XY coordinate system (orthogonal coordinate system), and the base extends in a direction angled α (0<α<=30°) to a Y axis (i.e., extends in an oblique direction to an X axis). In this embodiment, a longitudinal direction of the base (2) is parallel to a Y' axis inclined at an angle θ to a vertical direction, as shown in FIG. 8(a)-(c). This allows the supporting body (6) pushing the arrow part (4a) to have the same effect as the supporting body (6) having an inclined plane inclined at angle θ as in the embodiment 1.

The holding part (8p, 8s) is attached to the lower supporting part (2) and consists of a holding plate (8p) extending in a longitudinal direction of the base (2). The lower grasping part (4) and the arrow part (4a) are movably fitted into a space (SP) defined by the base (2) and the lower supporting part (2b). Furthermore, a projection (6p) is formed on the supporting body (6), and a guide groove (2C) is formed on the base (2) in a longitudinal direction thereof. The projection (6p) is fitted into the guide groove (2C). The supporting body (6) also has a spherical object (6B) embedded via a spring (6S) which allows the supporting body (6) to be held at a certain posture between the base (2) and the holding plate (8p) supporting body (6).

INDUSTRIAL APPLICABILITY

The wire grip according to the first aspect of the present invention comprises an upper grasping part provided at a top part of a base for grasping an electric wire from above; a lower grasping part arranged to face the upper grasping part with the electric wire interposed therebetween and provided to be movable in a vertical direction with respect to the base; an arrow part provided at a bottom part of the lower grasping part integrally with the lower grasping part or as a separate body; a supporting body arranged on a side opposite to the lower grasping part with the arrow part interposed therebetween, wherein the supporting body pushes the arrow part by a screw screwed with a lower supporting part provided at a bottom part of the base and extending in a longitudinal direction of the base; and a holding part for holding the lower grasping part to prevent it from being spaced from the base, and thus has a remarkable effect that enables easy and secure grasping (gripping) to an electric wire and requires less components. In addition, the wire grip has another advantage of further improving workability by having additional structures; the holding part comprises a holding plate attached to the lower supporting part and extending in a longitudinal direction of the base, the arrow part is movably fitted into a space defined by the base and the lower supporting part, the arrow part is provided at a bottom part of the lower grasping part integrally with the lower grasping part, and the base is provided to extend obliquely to an extension direction of the upper grasping part.

The live wire distributing tool according to the second aspect of the present invention, being a live wire distributing tool having two wire grips described in the first aspect, has following structures; an electric wire is gripped by the two wire grips spaced from each other, an arrow part of one of the two wire grips is connected to one end of an extendable rod, and an arrow part of the other one of the two wire grips is connected to the other end of the extendable rod, and enables easy and secure grasping (gripping) to an electric wire and eliminate the necessity of stripping off an insulation film of the electric wire. In addition, the conventional wire grip used to require a very troublesome work to precisely identify a position of a core wire of an electric wire when a hot puller grasps (chucks) the electric wire. However, the wire grip of the present invention does not need such a work.

EXPLANATION OF NUMERALS

1 Wire Grip
2 Base
2a Upper supporting part
2b Lower supporting part
3 Upper grasping part
4 Lower grasping part
4a A surface opposed to the upper grasping part
5 Arrow part
5a Top surface
5b Inclined plane
5c Eye
5D Notch of the arrow part
6 Supporting body
6a Inclined plane
6g Hole
7 Annular member
10 Extendable rod
10a,10b Connecting part
20 Live wire distributing tool
Th Screw
Tha Eye
Thf Female screw
ThR Fall protection ring
W Electric wire

The invention claimed is:

1. A wire grip comprising:
    an upper grasping part provided at a base for grasping an electric wire from above;
    a lower grasping part arranged to face the upper grasping part with the electric wire interposed therebetween and provided to be movable in a vertical direction with respect to the base;
    an arrow part provided at a bottom part of the lower grasping part integrally with the lower grasping part or as a separate body;
    a supporting body arranged on a side opposite to the lower grasping part with the arrow part interposed therebetween, wherein the supporting body pushes the arrow part by a screw to be screwed with a lower supporting part provided at a bottom part of the base and extending in a longitudinal direction of the base; and
    a holding part for holding the lower grasping part to prevent the lower grasping part from being spaced from the base,
    wherein the holding part comprises:
        a hollow part formed at the lower grasping part, wherein the arrow part is movably fitted into the hollow part;
        two legs allowing the lower grasping part to cross the base; and
        a guide part to connect the two legs via the base,
    wherein the arrow part is provided at the bottom part of the lower grasping part as a separate body, and
    wherein the base is provided to extend in a vertical direction to an extending direction of the upper grasping part.

2. The wire grip according to claim 1, wherein a plurality of spikes is provided on a surface of the lower grasping part opposed to the upper grasping part.

3. The live wire distributing tool having two wire grips according to claim 1,
    wherein an electric wire is gripped by the two wire grips spaced from each other,
    wherein an arrow part of one of the two wire grips is connected to one end of an extendable rod, and
    wherein an arrow part of the other one of the two wire grips is connected to an opposing end of the extendable rod.

* * * * *